July 28, 1959   R. C. BARROWS ET AL   2,897,383
ALTERNATING CURRENT DYNAMOELECTRIC MACHINE
Filed March 12, 1957

WITNESSES
Edwin E. Bassler
Wm. B. Sellers.

INVENTORS
Robert C. Barrows &
Herman J. Braun
BY
ATTORNEY

United States Patent Office 2,897,383
Patented July 28, 1959

2,897,383
ALTERNATING CURRENT DYNAMOELECTRIC MACHINE

Robert C. Barrows, Lima, and Herman J. Braun, Shawnee Township, Allen County, Ohio, assignors to Westinghouse Electric Corporation, East Pittsburgh, Pa., a corporation of Pennsylvania Application March 12, 1957, Serial No. 645,616

7 Claims. (Cl. 310—68)

The present invention relates to alternating current dynamoelectric machines and, more particularly, to synchronous alternating current machines of the type usually referred to as the brushless type.

Synchronous alternating current machines of the brushless type have a stationary member with an alternating current armature winding and a rotating member with a direct current field winding. Excitation for the direct current field is provided by an alternating current exciter which has a stationary direct current field member and a rotating alternating current armature member mounted on the same shaft as the field member of the main machine. The exciter armature winding is connected to the direct current field winding of the main machine through a rotating rectifier assembly, also mounted on the same shaft, to supply direct current excitation to the field of the main machine. In this way, an alternating current machine is provided which has many advantages since it requires no commutator, slip rings or brushes such as are necessary in the conventional type of machine using a direct current exciter.

The rotating rectifier assembly used in machines of the brushless type consists of a suitable number of semiconductor rectifiers connected together in a suitable rectifier circuit, and in the constructions which have been used heretofore the rectifiers have been mounted on a circular support member or disc mounted on the shaft, usually between the main machine and the exciter. This prior construction, however, has a number of disadvantages. A rotating rectifier assembly of this kind is relatively large and takes up a considerable amount of space, undesirably increasing the length of the machine. The rectifiers themselves are subjected to rather large centrifugal forces, especially in the case of high speed machines such as aircraft generators which must operate at relatively high speeds to provide a frequency of 400 cycles per second. The rectifiers are very difficult to cool adequately, especially in liquid cooled machines where they are relatively remote from the cooling liquid, and they are not readily accessible for repair or replacement. Thus, the usual type of rectifier construction which has been used in generators of the brushless type has numerous disadvantages.

The principal object of the present invention is to provide an alternating current synchronous machine of the brushless type in which field excitation is supplied from an alternating current exciter through a rotating rectifier assembly and in which the rectifier assembly is constructed and disposed in such a manner that the space required is reduced to a minimum and the other disadvantages mentioned above are avoided.

A more specific object of the invention is to provide an alternating current dynamoelectric machine of the brushless type described above in which the rotating rectifier assembly is disposed inside a hollow shaft, so that the rectifier assembly requires little additional space in the machine while the centrifugal force on the rectifiers is reduced to a minimum and the rectifiers are readily accessible and easily cooled.

A further object of the invention is to provide a construction for a fluid-cooled alternating current dynamoelectric machine of the brushless type in which the cooling fluid circulates through a hollow shaft to cool the rotating parts of the machine, and in which a rotating rectifier assembly is disposed within the hollow shaft to be directly cooled by the cooling fluid while the space required and the centrifugal force on the rectifiers are reduced to a minimum.

Other objects and advantages of the invention will be apparent from the following detailed description, taken in connection with the accompanying drawing, in which.

Figure 1:
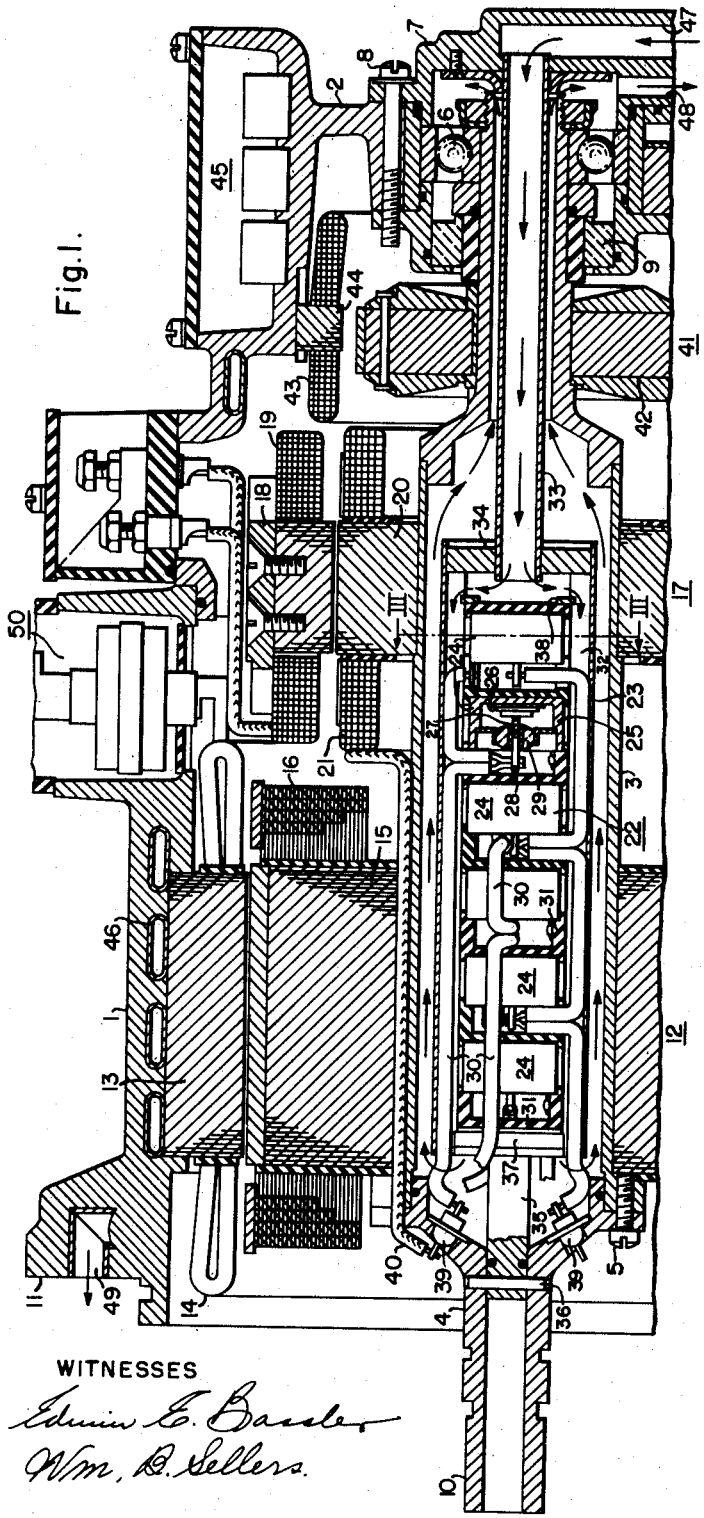
Figure 1 is a partial longitudinal sectional view of a dynamoelectric machine embodying the invention.

The invention is shown in the drawing, for the purpose of illustration, embodied in a liquid cooled alternating current aircraft generator of the type shown and described in a copending application of H. D. Else et al., Serial No. 553,079, filed December 14, 1955. It will be understood, however, that the present invention is not restricted in its application to machines of this type, or to liquid cooled machines, but is generally applicable to any synchronous machine of the brushless type.

The machine shown in the drawing has a frame member 1 of any suitable construction and has a bracket portion 2 at one end. The machine has a hollow shaft 3 which is closed at one end by a stub shaft 4 attached to the shaft 3 in any desired manner, as by screws 5. The other end of the shaft 3 may be of reduced diameter and is supported in an anti-friction bearing 6 mounted in a bore in the bracket portion 2. The bearing bore is closed by an end cap 7 secured to the bracket 2 in any suitable manner, as by screws 8, and the inner end of the bearing bore is preferably closed by an oil seal 9, of any suitable type, to prevent substantial leakage of oil from the bearing into the machine.

The particular machine shown has only one bearing, the stub shaft 4 at the opposite end having a splined portion 10 for engagement with a suitable driving means (not shown), and in use the machine is intended to be mounted on its prime mover by means of a flange 11 on the frame with the splined end of the shaft 4 supported in a driving member in the prime mover which has its own bearing. It will be understood, however, that, if desired, a conventional end bracket and bearing of any suitable type could be provided at the drive end of the machine.

Figure 2:
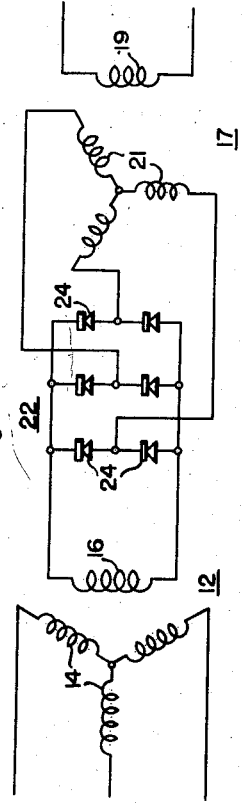
Fig. 2 is a schematic diagram showing the electrical connections of the machine.

The alternating current generator 12 has a laminated core 13 of any suitable or usual construction supported in the frame 1 and carrying an alternating current armature winding 14 which is shown as a three-phase winding in Fig. 2. The generator 12 has a field structure mounted on the shaft 3 in position to cooperate with the armature member. The field structure may be of any suitable type and may consist of a suitable number of salient poles 15 carrying a direct current field winding 16. The armature winding 14 may be connected to a terminal assembly 50 of any desired type.

Excitation for the field winding 16 is provided by an alternating current exciter 17. The exciter 17 has a stationary direct current field structure 18 of any suitable type mounted in the frame 1 or bracket 2 and carrying a field winding 19. The exciter 17 has a rotating armature member including a laminated core 20 of any suitable construction mounted on the shaft 3 and carrying an alternating current armature winding 21, which is shown in Fig. 2 as a three-phase winding. The exciter field winding 19 may be excited with direct current from any suitable external source, or may be excited from the output of the generator 12 through a rectifier and voltage regulator.

As shown in Fig. 2, the exciter armature winding 21 is connected to the field winding 16 of the generator 12 through a rotating rectifier assembly 22, which is shown as a conventional three-phase rectifier bridge circuit. Since the exciter armature, the rectifier assembly, and the generator field are all mounted on the same rotating shaft, they can be directly connected together and the generator is thus provided with direct current excitation without requiring any commutator, brushes, or slip rings.

In accordance with the present invention, the rectifier assembly 22 is disposed within the hollow shaft 3, and the rectifier assembly is shown as being mounted in a tubular housing member 23 which is supported concentrically within the shaft 3 for rotation therewith.

The rectifier assembly 22 consists of a suitable number of semiconductor rectifiers or diodes 24. The rectifiers 24 may be of any suitable construction and are shown, for the purpose of illustration, as consisting of a cup-shaped metal housing or container 25 which also serves as one terminal of the rectifier. One side of the rectifier cell or diode 26 is soldered or otherwise attached to the inner surface of the housing 25, silicon diodes preferably being used because of their high current capacity and ability to operate at high temperatures. A flexible conductor 27 is attached to the other side of the diode 26 within the housing and is joined to a rigid terminal 28 which extends out of the housing 25 and is secured in place and insulated from the housing by an insulating bushing 29. The housing 25 is sealed and may be evacuated or filled with an inert gas.

Figure 3:
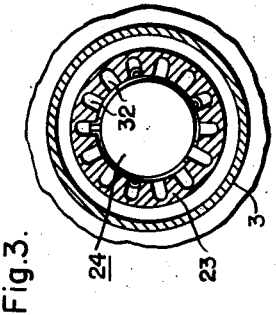
Fig. 3 is a fragmentary transverse sectional view approximately on the line III—III of Fig. 1.

Any suitable number of rectifiers 24 may be provided and they are connected together in any suitable rectifier circuit by conductors 30 within the housing 23. The rectifiers are held in position in the housing and insulated from each other by generally annular spacer members 31 of insulating material which fit snugly in the housing and are placed between the rectifiers to hold them in position. The housing 23 preferably has internal grooves 32, as shown in Fig. 3, to accommodate the conductors 30 and to permit the passage of cooling fluid in direct contact with the rectifiers 24 as described hereinafter.

The housing 23 is supported concentrically in the hollow shaft 3 for rotation therewith. A stationary hollow tube 33 is mounted in the end cap 7 at the end of the machine and extends through the reduced portion of the shaft into the end of the rectifier housing 23. The housing is rotatably supported on the tube 33 by an end closure member 34 which is secured in the end of the housing 23 and engages the tube 33 for rotation thereon. The other end of the housing 23 is supported by a rod 35 which is fixed to the stub shaft 4 in any suitable manner, as by a pin 36. The rod 35 terminates in a support member 37 which bears against the end spacer 31, to hold the assembled rectifiers 24 and spacers 31 against a stop member 38 at the opposite end, and engages the housing 23 to effect rotation of the rectifier assembly with the shaft.

The conductors 30 of the rectifier assembly may be arranged in any suitable manner and, in the three-phase circuit shown, they include three alternating current input leads and two direct current output leads, as indicated in Fig. 2. These input and output leads are connected, respectively, to five terminal devices 39 mounted in the stub shaft 4 at the end of the machine for convenience of access. The terminals 39 may be of any suitable type and are secured in the shaft with liquid-tight seals to prevent escape of the cooling fluid with which the shaft is filled during operation, as explained below. The alternating current input terminals are connected to the exciter armature winding 21 by conductors 40, and the direct current output terminals are similarly connected to the generator field winding 16.

The particular machine shown for the purpose of illustration also includes an electrically separate auxiliary generator 41 having a permanent magnet rotor 42 on the reduced portion of the shaft 3, and an armature winding 43 on a laminated core 44 supported on the bracket 2. The auxiliary generator 41 is intended to be used with a rectifier assembly 45 to supply direct current power for control purposes. This auxiliary generator is independent of the main generator 12, and is not a part of the invention and may be omitted if desired.

As previously mentioned, the machine shown in the drawing is a liquid cooled machine of the type disclosed and claimed in the above-mentioned Else et al. application. This machine is cooled by circulation of a suitable cooling liquid, preferably oil, through the hollow shaft 3 to cool the rotating parts of the machine and through a helical cooling passage or cooling coil 46 embedded in the frame 1 to cool the stationary parts of the machine.

In the illustrated embodiment, oil is supplied to the machine through a radial passage 47 formed in a boss on the end cap 7 and flows through the stationary tube 33 into the rectifier housing 23, as indicated by the arrows in Fig. 1. The oil flows through the rectifier housing directly over the rectifiers 24, thus cooling the rectifiers very effectively since the oil is in direct thermal relation with the rectifiers. The oil flows from the other end of the rectifier housing into the end of shaft 3, which is closed by the stub shaft 4, and flows back on the outside of the housing 23, in the annular space between the housing and the inner surface of the shaft, to effectively cool the rotor members mounted on the shaft. The oil escapes from the open end of the shaft into the enclosed space formed by the bearing bore and end cap 7, flooding the bearing 6 to lubricate the bearing, and escapes from this space through a passage 48 which is connected in any suitable manner with the helical cooling passage 46, so that the oil flows through the frame to cool the stationary parts of the machine, and is finally discharged through an opening 49 in the mounting flange 11.

It will now be apparent that a generator of the brushless type has been disclosed which has many advantages. The rotating rectifier assembly 22 is disposed within the hollow shaft so that it requires little space and the overall length of the machine is not increased over that of a conventional machine with a direct current exciter. This is an important advantage, especially in the case of aircraft generators which are mounted at one end on a prime mover so that the length must be kept as small as possible. The new arrangement also reduces the centrifugal force on the rectifiers to a minimum, since they are located substantially on the axis of the machine so that the centrifugal forces are quite low even when the machine is rotating at high speed. The arrangement of the rectifiers within the shaft also makes it possible to cool them very effectively since the cooling fluid, whether a liquid as shown or air, can be circulated directly over the rectifiers in very good thermal relation with them and very effective cooling is thus obtained. The arrangement disclosed also makes the rectifiers readily accessible for replacement or repair when necessary, and is thus a great improvement over prior constructions in which the rectifiers were supported on a rotating disc between the generator and the exciter where they were almost completely inaccessible.

It is to be understood that, although a specific embodiment of the invention has been shown and described for the purpose of illustration, the invention is not limited to this specific embodiment. Thus, any type of cooling may be utilized and the invention is applicable to either air or liquid cooled machines of any type in which the cooling medium, either liquid or gaseous, may be circulated through a hollow shaft. It will also be evident that the invention is not limited to use in aircraft generators but is applicable to any type of synchronous alternating current machine. It will be understood, therefore, that the invention is not limited to the specific embodiment and details of construction shown for the purpose of illustration, but in its broadest aspects it includes all equivalent embodiments and modifications.

We claim as our invention:

1. An alternating current dynamoelectric machine comprising a stator member including a stator core carrying an alternating current armature winding, a rotor member including a hollow shaft and a field structure on the shaft carrying a direct current field winding, exciting means for said field winding including an exciter having a stationary direct current field member, an armature member mounted on said shaft and carrying an alternating current armature winding, a rectifier assembly disposed within the hollow shaft, means for electrically connecting the rectifier assembly between the exciter armature winding and said direct current field winding to supply direct current excitation thereto, and means for directing a cooling fluid into said hollow shaft to flow therethrough in heat exchange relation with the rectifier assembly.

2. An alternating current dynomoelectric machine comprising a stator member including a stator core carrying an alternating current armature winding, a rotor member including a hollow shaft and a field structure on the shaft carrying a direct current field winding, exciting means for said field winding including an exciter having a stationary direct current field member, an armature member mounted on said shaft and carrying an alternating current armature winding, a tubular housing member supported concentrically within the hollow shaft for rotation therewith, a rectifier assembly mounted in said housing member, and means for electrically connecting the rectifier assembly between the exciter armature winding and said direct current field winding to supply direct current excitation thereto.

3. An alternating current dynamoelectric machine comprising a stator member including a stator core carrying an alternating current armature winding, a rotor member including a hollow shaft and a field structure on the shaft carrying a direct current field winding, exciting means for said field winding including an exciter having a stationary direct current field member, an armature member mounted on said shaft and carrying an alternating current armature winding, a tubular housing member supported concentrically within the hollow shaft for rotation therewith, a rectifier assembly mounted in said housing member, means for electrically connecting the rectifier assembly between the exciter armature winding and said direct current field winding to supply direct current excitation thereto, and means for directing a cooling fluid into the shaft and through the housing member.

4. An alternating current dynamoelectric machine comprising a stator member including a stator core carrying an alternating current armature winding, a rotor member including a hollow shaft and a field structure on the shaft carrying a direct current field winding, exciting means for said field winding including an exciter having a stationary direct current field member, an armature member mounted on said shaft and carrying an alternating current armature winding, a tubular housing member supported concentrically within the hollow shaft for rotation therewith, a plurality of semiconductor rectifier devices mounted in said housing member and connected together in a rectifier circuit, alternating current input terminals and direct current output terminals for said said rectifier circuit mounted on the shaft, and means for connecting the alternating current terminals to said exciter armature winding and for connecting the direct current terminals to said direct current field winding.

5. An alternating current dynamoelectric machine comprising a stator member including a stator core carrying an alternating current armature winding, a rotor member including a hollow shaft and a field structure on the shaft carrying a direct current field winding, exciting means for said field winding including an exciter having a stationary direct current field member, an armature member mounted on said shaft and carrying an alternating current armature winding, a tubular housing member supported concentrically within the hollow shaft for rotation therewith, a plurality of semiconductor rectifier devices mounted in said housing member and connected together in a rectifier circuit, alternating current input terminals and direct current output terminals for said rectifier circuit mounted on the shaft, means for connecting the alternating current terminals to said exciter armature winding and for connecting the direct current terminals to said direct current field winding, and means for directing a cooling fluid to flow through the housing member in one direction and between the housing member and the shaft in the opposite direction.

6. A dynamoelectric machine having a stator member and a rotor member, said stator member comprising a frame, a stator core supported in the frame and carrying an alternating current winding, a direct current field structure supported in the frame, said rotor member comprising a hollow shaft, a direct current field member having a field winding thereon carried on the shaft in position to cooperate with said alternating current winding, a rotor core having an alternating current winding carried on the shaft in position to cooperate with the first-mentioned direct current field structure, a rectifier assembly disposed within the hollow shaft, said rectifier assembly having alternating current terminal means connected to the alternating current winding of said rotor core and having direct current terminal means connected to the field winding of said direct current field member on the shaft, and means for causing a cooling fluid to flow through the shaft in heat exchange relation with the rectifier assembly.

7. A dynamoelectric machine having a stator member and a rotor member, said stator member comprising a frame, a stator core supported in the frame and carrying an alternating current winding, a direct current field structure supported in the frame, said rotor member comprising a hollow shaft, a direct current field member having a field winding thereon carried on the shaft in position to cooperate with said alternating current winding, a rotor core having an alternating current winding carried on the shaft in position to cooperate with the first-mentioned direct current field structure, a tubular housing member supported concentrically in the shaft for rotation therewith, a rectifier assembly disposed in said housing member, alternating current input terminals and direct current output terminals for the rectifier assembly mounted on the shaft and secured thereto with liquid-tight seals, means for connecting the alternating current terminals to the alternating current winding of said rotor core, means for connecting the direct current terminals to the field winding of said direct current field member on the shaft, and means for directing a cooling liquid to flow through the housing member in one direction and then between the housing member and the shaft in the opposite direction.

References Cited in the file of this patent

UNITED STATES PATENTS

| | | |
|---|---|---|
| 1,135,327 | Savage | Apr. 13, 1915 |
| 1,258,154 | Shepard et al. | Mar. 5, 1918 |
| 2,296,137 | Bertea | Sept. 15, 1942 |
| 2,722,652 | Brainard | Nov. 1, 1955 |